J. JONES.
COMBINED GARBAGE CAN AND TRAP.
APPLICATION FILED NOV. 19, 1917.
1,276,770.
Patented Aug. 27, 1918.
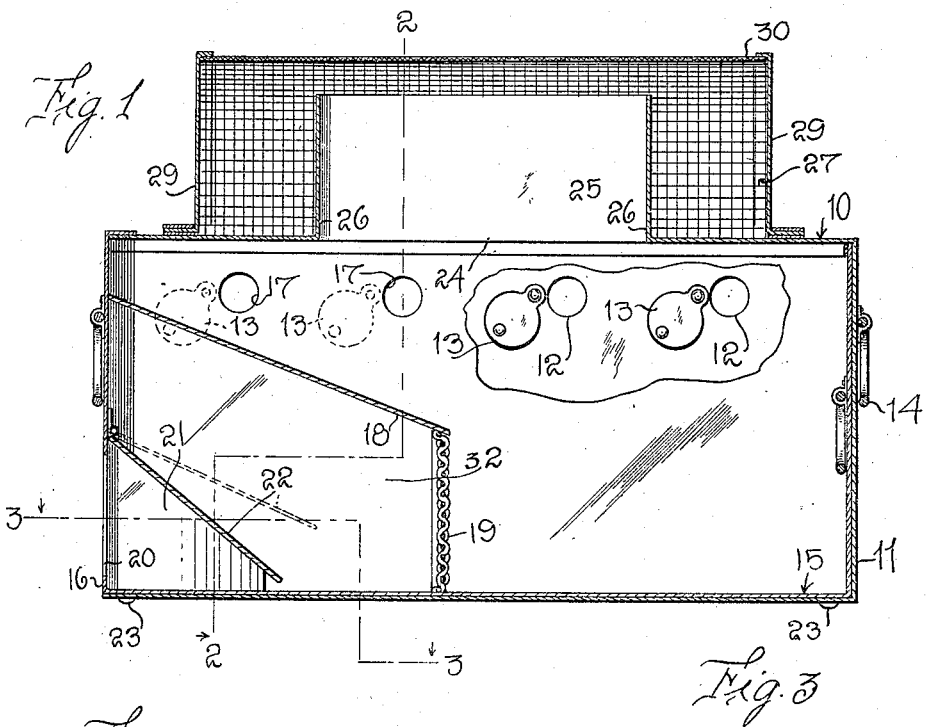
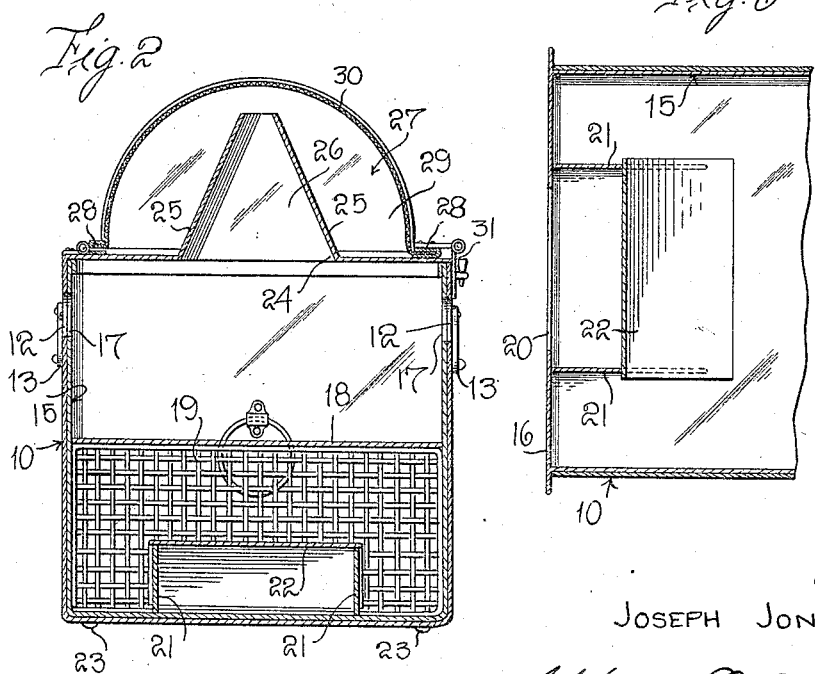
Inventor
JOSEPH JONES
By Watson E Coleman
Attorney

UNITED STATES PATENT OFFICE.

JOSEPH JONES, OF NEW ORLEANS, LOUISIANA.

COMBINED GARBAGE-CAN AND TRAP.

1,276,770.   Specification of Letters Patent.   Patented Aug. 27, 1918.

Application filed November 19, 1917. Serial No. 202,816.

*To all whom it may concern:*

Be it known that I, JOSEPH JONES, a citizen of the United States, residing at New Orleans, in the county of Orleans and State of Louisiana, have invented certain new and useful Improvements in Combined Garbage-Cans and Traps, of which the following is a specification, reference being had to the accompanying drawings.

This invention relates to garbage cans, and particularly to the combination of a trap with the garbage can.

It is a well known fact that rats are attracted by garbage and in cities and towns they principally live off of garbage, and to such an extent that if garbage cans are kept closed, the rats will decrease very rapidly. It is also well known that flies breed in and live on garbage and that both flies and rats are carriers of disease. Every effort is, consequently, being made by the National and State health authorities to prevent the access of rats to garbage cans and to kill both rats and flies.

The general object of this invention is to provide a combined garbage can, rat trap and fly trap, so constructed that the garbage will act as a bait to the rats and flies, and further so constructed that the rats cannot obtain actual access to the garbage itself and that the flies, while having free access to the garbage can, are directed into a fly trap from which exit is practically impossible.

With these and other objects in view, I have constructed a very simple form of garbage receiver in which the garbage receptacle is removably disposed in an outer case, this case having connected with it certain trapping compartments, one for rats and the other for flies, the traps and case being so formed that the garbage may be discharged from the receptacle without releasing the rats or the flies.

Other objects will appear in the course of the following description.

My invention is illustrated in the accompanying drawing, wherein:—

Figure 1 is a vertical longitudinal sectional view of a garbage can and trap constructed in accordance with my invention;

Fig. 2 is a section on the line 2—2 of Fig. 1; and

Fig. 3 is a section on the line 3—3 of Fig. 1.

Referring to these figures, it will be seen that my device comprises an outer casing 10, which is of sheet metal, preferably rectangular in cross section and closed at one end, as at 11, the opposite end of the casing being open. The sides of this casing are formed with a plurality of openings 12, preferably disposed adjacent the top of the casing, and pivotally mounted upon the exterior of the casing are a plurality of covers 13 which may be shifted over the openings 12 to close the same or be shifted away from the openings to permit flies to pass into the interior of the casing through the openings 12. A handle 14 is attached to the closed end of the casing.

Slidably mounted within the casing is a garbage container 15 which is also rectangular in section and preferably fits the casing snugly but has sliding engagement therewith. This container has a length equal to that of the casing and at its outer end, the front wall 16 of the container is wider than the casing and extends above the top wall of the casing and is inwardly bent so as to fit thereover. The side walls of the container are also formed with a plurality of openings 17 which, when the container is in place within the casing, register with the openings 12.

Extending downward from the front wall 16 and extending nearly to the middle of the container, is an inclined wall 18, which is attached to the side walls of the container and extending downward from the inner end of this wall 18 to the floor of the container is a partition 19 of perforated metal or wire mesh, preferably the latter, the mesh being relatively large. The front wall 16 of the casing is formed with an opening 20, which is disposed entirely below the inclined wall 18 and which is less in width than the width of the casing, there being wing walls 21 disposed on each side of this opening, the upper edges of these wing walls extending downward and toward the floor.

Pivotally mounted upon the front wall of the casing and normally resting upon these wing walls is a trap door 22 which is urged downward by gravity or may be urged downward by a spring, if desired, and which in its downward position has its lower edge disposed adjacent to the floor or in contact therewith. Preferably this lower edge is raised slightly from the floor so as to provide a sufficient space for the passage of effluvium from the garbage. Preferably the casing is supported upon legs 23, which raise it slightly above the floor, though these legs are not absolutely necessary.

The top of the casing 10 is formed with a longitudinally extending opening 24 and extending upward from this opening are the upwardly convergent walls 25, the upper ends of these walls being spaced slightly from each other. Also extending upward from the top are the end walls 26. Thus I provide an upwardly contracted passageway leading from the casing into a trapping chamber 27. This chamber is formed by a rectangular frame 28 of thin metal, end walls 29 and a covering of wire gauze 30. The frame 28 is hinged to the top of the casing so that it may be lifted but normally the trapping chamber is held down upon the top of the casing by means of a latch 31.

In the practical use of this invention, garbage is placed within the container by withdrawing the container entirely or partially from the casing. If the drawer like container is only withdrawn partially from the casing, then garbage deposited in the container will fall down upon the inclined opening 18 and so be discharged into the body of the container. The container is then forced into the casing. Flies attracted by the garbage will pass into the openings 12 and 17 into the interior of the container and attracted by the light passing downward through the slit between the walls 25, will fly upward into the trapping compartment 27. Once in the compartment, they will not be likely to return through this slit into the main body of the container as the slit or space will be sufficiently narrow that it will impede the entrance of the flies into the container. Furthermore, if there are any flies on the garbage at the time that it is desired to empty the container, then by shaking the container slightly, the flies will be dislodged from the garbage and will fly upward into the trapping compartment 29. Rats attracted by the smell of the garbage will enter the passageway between the wing walls 21 and in their entrance will lift the trap door 22 and pass into the trapping compartment 32. Once in this trapping compartment, they cannot return because the door 22 has fallen behind them, nor can they, of course, enter the compartment where the garbage is disposed. Thus when it is desired to empty the garbage container, this may be done without the escape of any rats and afterward the door 22 may be opened to permit the rats to fall out into a suitable receptacle or permit the destruction of the rats in any desired manner. Of course means may be provided upon the exterior of the container whereby the door 22 may be opened, as for instance by providing a handle upon the door. Handles are provided at the ends of the casing 15 for the purpose of handling the casing.

It will be understood, of course, that this device is susceptible of many modifications and that it may be embodied in many different forms, without departing from the spirit of the invention.

Having described my invention, what I claim is:

A combined garbage receptacle and trap comprising a rectangular casing open at one end, and a garbage container in the form of a drawer insertible into said casing and open at its top, the front wall of the container having an entrance opening, a trap door opening inward and normally closing said entrance opening, a trapping compartmet having a wall extending downward and rearward from the front wall of the garbage container, and having a length less than the length of the garbage container, and a perforated screen disposed between the rear edge of this wall and the bottom of the container, the opening in the container leading into said trapping compartment.

In testimony whereof I hereunto affix my signature in the presence of two witnesses.

JOSEPH JONES.

Witnesses:
HENRY K. SAMUEL,
CHARLES B. CONWAY.

Copies of this patent may be obtained for five cents each, by addressing the "Commissioner of Patents, Washington, D. C."